United States Patent [19]
Jones et al.

[11] Patent Number: 5,250,953
[45] Date of Patent: Oct. 5, 1993

[54] TRACKING RADAR SYSTEMS

[75] Inventors: Michael A. Jones, Edgware; John W. Attwood, Watford; John T. Floyd, Hemel Hempstead; Alan J. Mitchell, Borehamwood, all of United Kingdom

[73] Assignee: The Marconi Company Limited, Chelmsford, England

[21] Appl. No.: 851,895

[22] Filed: Nov. 10, 1977

[30] Foreign Application Priority Data

Nov. 19, 1976 [GB] United Kingdom ............ 48345

[51] Int. Cl.$^5$ ............ G01S 13/00; G01S 5/02; F41G 7/00
[52] U.S. Cl. ............ 342/62; 244/3.19; 342/92; 342/149; 342/423; 342/427
[58] Field of Search ............ 343/117 R, 119, 7 A, 343/7 AG, 16 M; 244/3.19; 342/92, 149, 62, 423, 427

[56] References Cited

U.S. PATENT DOCUMENTS

| | | |
|---|---|---|
| 2,995,750 | 8/1961 | Holcomb et al. |
| 3,206,753 | 9/1965 | McCoy |
| 3,378,843 | 4/1968 | Sherman |
| 3,713,155 | 1/1973 | Jaffe ............ 342/92 |
| 3,728,723 | 4/1973 | Gellekink ............ 342/80 |
| 3,921,175 | 11/1975 | Hughes et al. ............ 342/432 |
| 3,949,955 | 4/1976 | Sykes et al. ............ 342/62 |

Primary Examiner—Stephen C. Buczinski
Attorney, Agent, or Firm—Kirschstein

[57] ABSTRACT

A tracking radar system comprising an aerial arrangement having a plurality of outputs, means for deriving from the aerial outputs a sum signal representative of the sum of the aerial outputs and a difference signal representative of the direction of a target relative to the aerial, a receiver for processing said sum and difference signals to produce corresponding intermediate frequency sum and difference signals, means for comparing the intermediate frequency sum signal with the output of an oscillator in a first phase-locked loop and using the resulting signal to control the oscillator frequency so as to cause the oscillator to lock on to the frequency of the intermediate frequency sum signal, a phase-sensitive detector for comparing the intermediate frequency difference signal with the output of the oscillator to produce an output signal representative of the phase difference between the sum and difference signals, and bandwidth alteration means responsive to the sum signal to alter the bandwidth of the first phase-locked loop.

15 Claims, 7 Drawing Sheets

Fig. 8. M.T.D Locked to first sideband Scaling with pseudo sidebands $K = \frac{1}{\sqrt{2}}$

TRACKING RADAR SYSTEMS

This invention relates to radar systems and more particularly to static-split tracking radar systems, i.e. radar systems in which directivity is found by simultaneous comparison of signals derived from separate aerial outputs.

In a typical static-split tracking radar system, a target is tracked by means of a multi-element aerial, producing a plurality of radio frequency outputs. These outputs may typically be added and subtracted to produce a sum signal and at least one difference signal, which signals are processed in a multi-channel receiver, and the resulting intermediate frequency outputs are then compared in amplitude and/or phase so as to produce at least one output signal, representing the direction of the target relative to the aerial.

In our U.K. Patent Application No. 24586/76, a tracking radar system is described which comprises an aerial arrangement having a plurality of outputs, means for deriving from the aerial outputs a sum signal, representative of the sum of the aerial outputs, and a difference signal representative of the orientation of a target relative to the aerial, and a receiver for processing said signals to produce corresponding intermediate frequency output signals, wherein the intermediate frequency sum signal is compared with the output of an oscillator in a first phase-locked loop, and the result used to control the oscillator frequency so as to cause the oscillator to lock on to the frequency of the intermediate frequency sum signal, the intermediate frequency difference signal being compared in a phase-sensitive detector with the output of the oscillator, so as to produce an output representative of the phase difference between the sum and difference signals.

In this way, the phase-locked loop acts effectively as a narrow band filter to select a single intermediate frequency, and thus assists in discriminating between targets having different doppler shifts.

The phase-locked loop may however in certain circumstances prove to be a disadvantage. If for example the missile is tracking a single target and the phase-locked loop is activated then the bandwidth of the phase-locked loop will be narrow. If the target frequency suddenly changes due for example in the case of an aircraft to a sharp turn then the frequency of the sum intermediate frequency signal at the input to the narrow band phase-locked loop will move outside the bandwidth of the phase-locked loop. If this should happen rapidly then the phase-locked loop would not be able to follow the incoming intermediate frequency sum signal and the missile would lose tracking and almost certainly miss the target.

It is an object of the present invention to alleviate the above problem and according to the present invention there is provided a tracking radar system comprising an aerial arrangement having a plurality of outputs, means for deriving from the aerial outputs a sum signal, representative of the sum of the aerial outputs, and a difference signal representative of the direction of a target relative to the aerial, and a receiver for processing said signals to produce corresponding intermediate frequency output signals, wherein the intermediate frequency sum signal is compared with the output of an oscillator in a first phase-locked loop, and the result used to control the oscillator frequency so as to cause the oscillator to lock on to the frequency of the intermediate frequency sum signal, the intermediate frequency difference signal being compared in a phase-sensitive detector with the output of the oscillator, so as to produce an output representative of the phase difference between the sum and difference signals and including bandwidth alteration means responsive to the sum signal to alter the bandwidth of the first phase-locked loop.

Preferably the bandwidth alteration means includes a variable gain circuit in the first phase-locked loop. The bandwidth alteration means may include a quadrature phase-sensitive detector for comparing the $\pi/2$ phase shifted output of the oscillator and the intermediate frequency sum signal, a filter and time delay circuit connected to the output of the quadrature phase detector, a threshold detector connected to the output of the filter and time delay circuit, a first output signal of the threshold detector in operation changing the gain of the variable gain circuit to decrease the bandwidth of the first phase-locked loop. In operation of the circuit a second output signal of the threshold detector is operative to increase the bandwidth of the first phase-locked loop.

In a preferred embodiment the first output signal is combined with a signal indicating acquisition of a valid target, both signals being required before the bandwidth of the phase-locked loop is decreased.

The variable gain circuit may include first changeover control means to control the decreasing of the bandwidth of the phase-locked loop in a gradual manner over a predetermined time period. The target acquisition signal and the first output signal, in a preferred embodiment, should be present for the whole of the predetermined time period.

The variable gain circuit may include second changeover control means to control the increasing of the bandwidth of the phase-locked loop in a more rapid manner over a relatively short time period compared to the predetermined time period.

The introduction of the multiple target discrimination using the narrow band phase-locked loop hereinbefore referred to as the first phase-locked loop may also introduce problems in the automatic gain control of the missile receiver circuitry. This is because the first phase-locked loop will lock to the frequency of one of the targets with a bandwidth sufficient to include that target signal but not sufficient to include any other target signals which may be amplified in the sum channel of the receiver prior to the first phase-locked loop. The spectral component of the output of the oscillator in the phase-locked loop will therefore be of greater amplitude than the corresponding component in the sum channel of the receiver because the automatic gain control operates on the total sum signal passing through the receiver. The angular scaling of the desired target signal will therefore be reduced and the present invention provides possible alternative systems to alleviate this problem.

According to the second aspect of the present invention there is provided a tracking a radar system comprising an aerial arrangement having a plurality of outputs, means for deriving from the aerial outputs a sum signal, representative of the sum of the aerial outputs, and a difference signal representative of the orientation of a target relative to the aerial, and a receiver for processing said signals to produce corresponding intermediate frequency output signals, wherein the intermediate frequency sum signal is compared with the output of an oscillator in a first phase-locked loop, and the result used to control the oscillator frequency so as to cause the oscillator to lock on to the frequency of the intermediate frequency sum signal, a quadrature phase-sensitive detector connected for comparison of the intermediate frequency sum signal and the $\pi/2$ phase shifted output of the oscillator, the output of the quadrature phase-sensitive detector being connected to the receiver for the provision of automatic gain control.

According to an alternative second aspect of the present invention there is provided a tracking radar system comprising an aerial arrangement having a plurality of outputs, means for deriving from the aerial outputs a sum signal, representative of the sum of the aerial outputs, and a difference signal representative of the direction of a target relative to the aerial, and a receiver for processing said signals to produce corresponding intermediate frequency output signals, wherein the intermediate frequency sum signal is compared with the output of an oscillator in a first phase-locked loop, and the result used to control the oscillator frequency so as to cause the oscillator to lock on to the frequency of the intermediate frequency sum signal, the intermediate frequency difference signal being compared in a phase-sensitive detector with the output of the oscillator, so as to produce an output representative of the phase difference between the sum and difference signals, a quadrature phase-sensitive detector connected for comparison of the intermediate frequency sum signal and the $\pi/2$ phase shifted output of the oscillator, a divider for division of the output of the phase-sensitive detector by the output of the quadrature phase-sensitive detector, the output of the divider being connected to the receiver for the provision of automatic gain control.

Preferably the system includes a low pass filter interposed between the output of the quadrature phase-sensitive detector and the divider. The time constant of the filter is preferably greater than 100 ms.

A further problem which arises from the use of the multiple target discriminating narrow band phase-locked loop is the variation in scaling which occurs due to the elimination of the normal sum signal sidebands which are present in the wide bandwidth receiver but are absent from the narrow bandwidth output of the voltage controlled oscillator in the first phase-locked loop.

The inventive solution to this problem is the introduction of constant amplitude sidebands to the output of the oscillator multiple target discriminating phase-locked loop, which sidebands have the same phase relationship to the oscillator output as the original sum signal sidebands have to their carrier.

According to a third aspect of the present invention there is provided a tracking radar system comprising an aerial arrangement having a plurality of outputs, means for deriving from the aerial outputs a sum signal, representative of the sum of the aerial outputs, and a difference signal representative of the direction of a target relative to the aerial, and a receiver for processing said signals to produce corresponding intermediate frequency output signals, wherein the intermediate frequency sum signal is compared with the output of an oscillator in a first phase-locked loop, and the result used to control the oscillator frequency so as to cause the oscillator to lock on to the frequency of the intermediate frequency sum signal, plus a second phase-locked loop including a second oscillator, a mixer, a linear multiplier and an integrator connected in series, in which the output of the second oscillator is connected to an input of the mixer for mixing of the second oscillator output signal with the output of the oscillator, in which the output of the mixer is connected to the linear multiplier for multiplication of the output signal from the balanced mixer by the intermediate frequency sum signal, the output of the linear multiplier being connected to the second oscillator via the integrator for control of the frequency of oscillation of the second oscillator, the output of the balanced mixer being connected to a combination circuit for combination of the balanced mixer output signal with the oscillator output signal, the combined signal when formed being the multiple target discriminated sum signal for use in guiding the radar system.

In a modification of the third aspect of the present invention the output of the balanced mixer of the second phase-locked loop is connected to a combination circuit included in the first phase-locked loop, the output of the combination circuit being the multiple target discriminated intermediate frequency sum signal for use in guiding the radar system.

In the above third aspect and modification thereof the combination circuit is preferably a linear adder.

The third aspect of the present invention also provides a method of compensating for sidebands in the sum signal channel of a receiver in a missile guidance system equipped with multiple target discrimination means including forming a relatively wide bandwidth intermediate frequency sum signal, forming a relatively narrow bandwidth intermediate frequency sum signal from the relatively wideband intermediate frequency sum signal adding to the relatively narrow bandwidth intermediate frequency signal sidebands signals corresponding to the sidebands in the relatively wideband intermediate frequency signal.

A yet further problem which arises with a radar guidance system using multiplexing techniques to compensate for variations in the gain of receiver channels is that low-frequency beats can occur between harmonics of the multiplexing frequency and multiples of the doppler difference frequency between two targets when the MTD is used and also multiples of the mutation frequency or when intentional jamming introduces the same effects. The present invention provides a method and apparatus for compensating for this effect.

According to a fourth aspect of the present invention there is provided in a missile guidance radar control system a method of compensating for disturbances produced by low frequency beating between harmonics of the multiplexing frequency and multiplies of the doppler difference frequency between two or more targets including processing the received signals from the two or more targets to produce a multiplexed intermediate frequency sum signal, comparing this signal with the multiplexing signal, monitoring the result of the comparison and using the result of the comparison to change the frequency of the multiplexing signal if low frequency beating is detected.

The invention in a first preferred embodiment of the fourth aspect provides a tracking radar system comprising an aerial arrangement having a plurality of outputs, a combining circuit for combining signals from the aerial outputs to produce at least two receiver input signals the relative phases and/or amplitudes of which contain information characterising the direction of a target relative to the aerial arrangement, a receiver having two channels to which the receiver input signals are respectively applied, modulation waveform generating means for the generation of a modulating waveform wherein the combining circuit is arranged to introduce modulation into the receiver input signals in synchronism with the modulating waveform so as to cause the receiver input signals to vary periodically in amplitude and phase relative to each other in such a manner that the average value of their difference as determined by a phase-sensitive detector over one cycle of the modulating waveform is zero, and including signal detection means connected to the output of the receiver for the detection of spurious outputs due to receiver output signals spaced apart in frequency by the modulation frequency are harmonics or sub-harmonics thereof and switching means responsive to said signal detection means connected between the signal detection means and the modulation waveform generating means for the alteration of the modulation frequency.

In a further preferred embodiment the receiver has a sum and a difference channel the signal detection means being connected to the output of the sum channel via a low pass filter. Preferably the signal detection means includes a phase-sensitive detector the filtered output signal derived from the sum channel of the receiver being compared with the output of the modulation waveform generator in the phase-sensitive detector for the production of an output signal of the signal detection means.

A further problem which arises with the use of the multiple target discriminating narrow band phase-locked loop is that the narrow intermediate frequency bandwidth can be of the order of 20–30 Hz and it is found in practice that the spectrum of a valid target return signal may widen up to 80 Hz if for example the target pulls a sudden high acceleration laterally. This is because of the widening effect of the glint spectrum. A constant narrow bandwidth phase-locked loop is found to have a reduced tracking ability on such a target and for target accelerations above a certain value this can cause loss of lock. This in turn causes an interruption in missile guidance and can result in a large miss distance or poor target discrimination. It is not necessary to apply the previously described solution to widen the bandwidth of the phase-locked loop to a very large bandwidth as for the complete loss of a target signal. The previous solution would probably only result, in the case of multiple targets in the missile changing to a second target and if sufficient time were not available for the change in course the missile would miss all targets. A preferred solution is to detect the widening of the target spectrum and increase the bandwidth of the narrow band phase-locked loop by a predetermined small amount. In a practical example the bandwidth is increased from 30 Hz to 80 Hz.

The present invention therefore provides in its fifth aspect a tracking radar system comprising an aerial arrangement having a plurality of outputs, means for deriving from the aerial outputs a sum signal, representative of the sum of the aerial outputs, and a difference signal representative of the direction of a target relative to the aerial, and a receiver for processing said signals to produce corresponding intermediate frequency output signals, wherein the intermediate frequency sum signal is compared with the output of an oscillator in a first phase-locked loop, and the result used to control the oscillator frequency so as to cause the oscillator to lock on to the frequency of the intermediate frequency sum signal, the intermediate frequency difference signal being compared in a phase-sensitive detector with the output of the oscillator, so as to produce an output representative of the phase difference between the sum and difference signals and including bandwidth alteration means responsive to the sum signal to alter the bandwidth of the first phase-locked loop, the bandwidth alteration means including means for detecting a broadened spectrum from a single target and means for broadening the bandwidth of the phase-locked loop by a predetermined amount to a bandwidth greater than the broadened spectrum.

Preferably the means for detecting a broadened spectrum includes a further phase-locked loop connected to the intermediate frequency sum signal output of the receiver the further phase-locked loop including a further phase-sensitive detector and a further oscillator, the phase-sensitive detector comparing the intermediate frequency sum signal with the output of the further voltage controlled oscillator, the output of the further phase-sensitive detector being connected to the comparator for comparison with a reference bias, the bandwidth of the phase-locked loop being broadened by the predetermined amount when the comparator output exceeds a predetermined threshold level.

A further problem which may occur with the use of the multiple target discriminating narrow band phase-locked loop is that it may not be able to track all types of target signals. The inventive solution to the problem is to latch out the multiple target discriminating narrow band phase-locked loop when such a target signal is detected. By the time that a decision to latch out the loop has been taken the doppler frequency of the target may also have moved outside the bandwidth of the relatively wide bandwidth speedgate filters within the missile receiver and it may be necessary to resume the doppler sweep to regain the target signal within the bandwidth of the receiver. It is desirable to regain the target signal as quickly as possible and therefore according to its sixth aspect the present invention also provides means for commencing the doppler sweep so as to follow the best recorded frequency change of the target.

The present invention therefore provides in its sixth aspect a tracking radar system comprising an aerial arrangement having a plurality of outputs, means for deriving from the aerial outputs a sum signal, representative of the sum of the aerial outputs, and a difference signal representative of the orientation of a target relative to the aerial, and a receiver for processing said signals to produce corresponding intermediate frequency output signals, wherein the intermediate frequency sum signal is compared with the output of an oscillator in a first phase-locked loop, and the result used to control the oscillator frequency so as to cause the oscillator to lock on to the frequency of the intermediate frequency sum signal, the intermediate frequency difference signal being compared in a phase-sensitive detector with the output of the oscillator, so as to produce an output representative of the phase difference between the sum and difference signals and including bandwidth alteration means responsive to the sum signal to alter the bandwidth of the first phase-locked loop, a discriminator circuit responsive to changes in the frequency of the output signal of the oscillator, a switching circuit connected to the output of the discriminator, in which in operation the bandwidth alteration means produces a change to wide bandwidth signal for energisation of a target search sweep generator, the direction of increase or decrease in frequency of the target search sweep generator being controlled by the switching circuit.

In a preferred embodiment the switching circuit is set in a first operative condition in response to a positive voltage output from the discriminator and in a second operative condition in response to a negative voltage output from the discriminator.

In a further preferred embodiment the change to wideband signal is operative to prevent further operation of the narrow band phase-locked loop.

The invention also provides in a more general aspect missiles including radar guidance systems as hereinbefore described in the first, second, third, fourth, fifth or sixth aspects of the present invention.

One radar system in accordance with the invention will now be described, by way of example, with reference to the accompanying drawings of which.

The system to be described is part of a homing head for an air-to-air missile. The system is a semi-active one, in which the target is illuminated with radio waves from a source remote from the missile, e.g. from the radar of the aircraft which launched the missile.

Figures 1, 3, 3A, 3B:
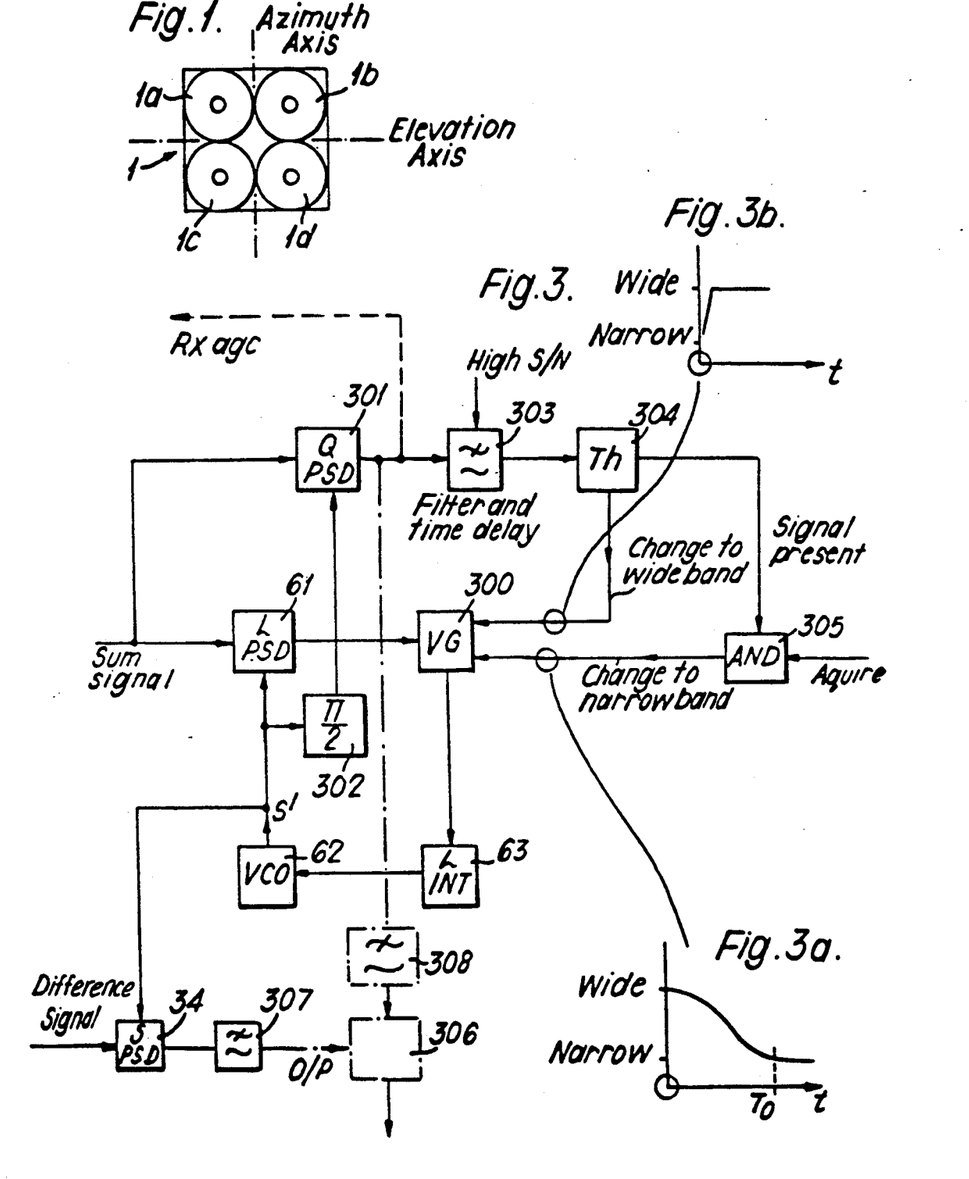
FIG. 1 is a schematic front elevation of the aerial of the radar system.
FIG. 3 shows in block diagrammatic form a modification to the narrow band phase-locked loop of FIG. 2 according to the present invention.

Referring to FIG. 1, the system includes an aerial arrangement 1, comprising an array of four aerial elements $1a$–$1d$, each of which has its own feed antenna and reflector dish. The axes of the four elements $1a$–$1d$ are all parallel to each other, so that when a radio signal is received from a target by the aerial, the resulting output signals from the four elements are all of substantially equal amplitude, but differ in phase, according to the direction of the target relative to the aerial. The aerial arrangement 1 is mounted on gimbals (not shown) so that it can be tilted about azimuth and elevation axes, by means of servo motors (not shown).

Figure 2:
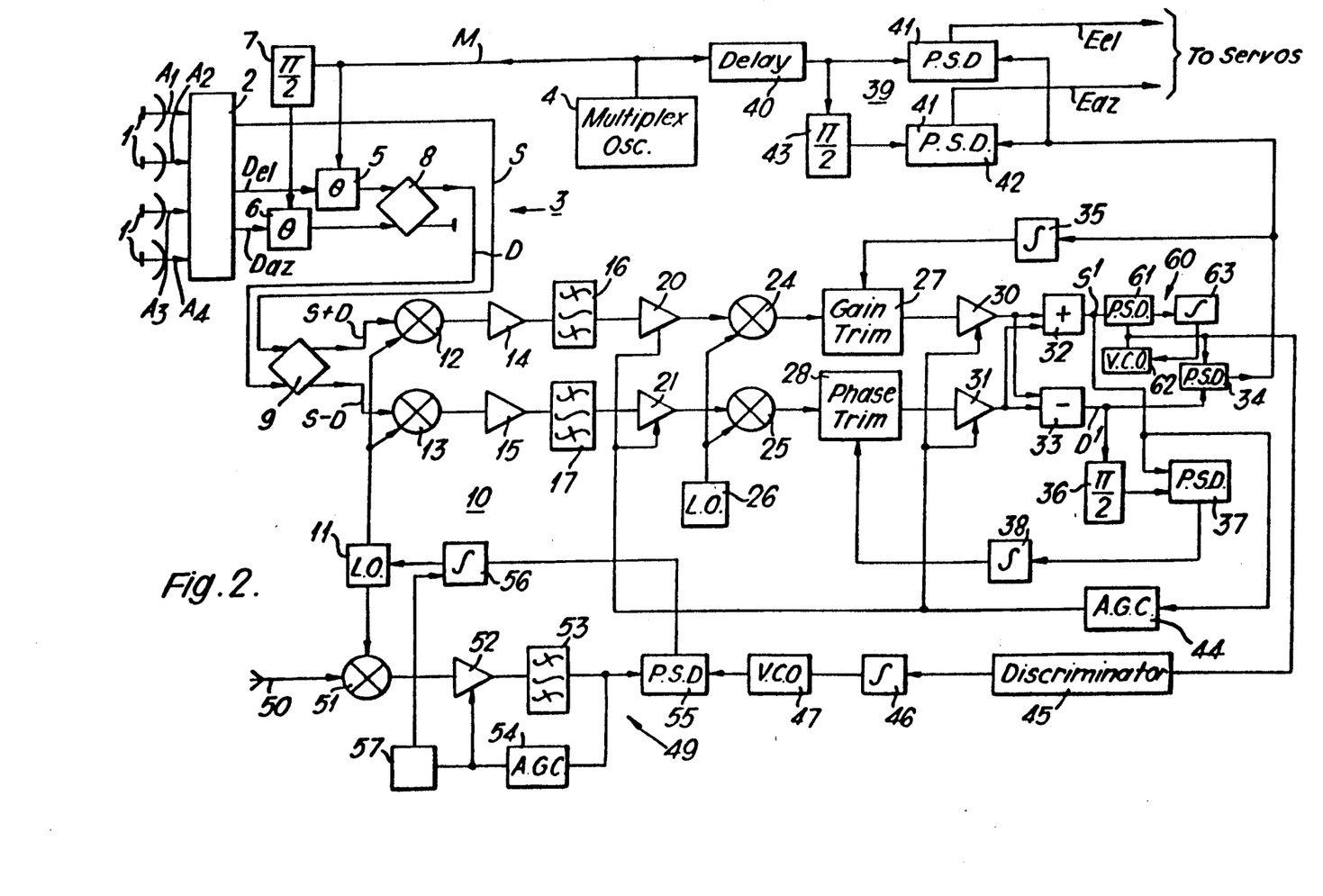
FIG. 2 is a schematic block circuit diagram of a known system.

Referring now to FIG. 2, a radar system is shown which is the subject matter of U.K. Patent Application No. 24586/76. The four aerial output signals are designated $A_1$, $A_2$, $A_3$ and $A_4$. These output signals are added and subtracted in a suitable circuit 2, to produce three signals S, $D_{el}$ and $D_{az}$, as follows:

$$S = (A_1 + A_2 + A_3 + A_4)$$

$$D_{el} = (A_1 + A_2) - (A_3 + A_4)$$

$$D_{az} = (A_1 + A_3) - (A_2 + A_4)$$

S is referred to as the sum signal, and is equal to the sum of the aerial outputs. $D_{el}$ and $D_{az}$ are referred to as the elevation and azimuth difference signals, and their amplitudes are measures of the elevation and azimuth error angles between the aerial axis and the target. Because of a 90° phase shift in the comparator 2, the signals $D_{el}$ and $D_{az}$ are approximately in phase with the sum signals. These three signals, $D_{el}$, $D_{az}$ and S pass through a rotating microwave joint on the aerial 1 to the following circuitry.

The two difference signals are multiplexed together in a multiplexer 3, which is controlled by a square wave modulating signal M from an oscillator 4. The multiplexer 3 comprises two phase switches 5 and 6 for phase modulating the signals $D_{el}$ and $D_{az}$ respectively. Phase switch 5 is driven directly by the output of the oscillator 4, and produces alternate 0° and 180° phase shifts in the $D_{el}$ signal, in phase with the modulating signal M. Phase switch 6 is driven by the oscillator 4 via a 90° phase shifter 7, and produces alternate 0° and 180° phase shifts in the $D_{az}$ signal, in quadrature with the modulation of the $D_{el}$ signal.

The outputs of the phase switches 5 and 6 are added together in a hybrid circuit 8, to produce a multiplexed difference signal D. It will be seen that the signal D, in each cycle of the modulating signal M, passes through the following sequence of values;

$$D_1 = D_{el} + D_{az}$$

$$D_2 = D_{el} - D_{az}$$

$$D_3 = -D_{el} - D_{az}$$

$$D_4 = -D_{el} + D_{az}$$

The difference signal D is fed to a hybrid circuit 9, along with the sum signal S, to produce two output signals $S+D$ and $S-D$, which are fed respectively to two channels of a superheterodyne receiver 10. Up to this stage of the system, the signals are al at microwave frequencies (except, of course, the modulating signal M), and therefore the comparator 2, phase switches 5 and 6, and hybrids 8 and 9 are all microwave components and are conveniently constructed using microstripline techniques.

The receiver 10 comprises a first local oscillator 11, the output of which is mixed with the signals S+D and S−D in mixers 12 and 13, to convert them to a suitable first intermediate frequency. The intermediate frequency signals are passed through intermediate frequency amplifiers 14 and 15 to band pass filters 16 and 17. These filters select only a narrow range of frequencies, corresponding to a narrow range of doppler shifts in the radio signal received from the target, i.e. corresponding to a narrow range of relative target-to-aerial speeds. For this reason, the filters 16 and 17 are referred to as speed gates.

The filtered signals are passed through further intermediate frequency amplifiers 20 and 21 to mixers 24 and 25, where they are mixed with a signal from a second local oscillator 26, to convert them to a suitable second intermediate frequency. The second intermediate frequency signals are then respectively passed through gain trim and phase trim circuits 27 and 28, and are amplified by second intermediate frequency amplifiers 30 and 31.

The outputs from the amplifiers 30 and 31 are combined in a sum circuit 32 and in a difference circuit 33 to produce intermediate frequency output signals $S^1$ and $D^1$ respectively. It will be seen that nominally (i.e. assuming that the two channels of the receiver 10 are equally matched in gain and phase difference) the intermediate frequency output $S^*$ from the sum circuit 32 is proportional to the radio frequency sum signal S, while the intermediate frequency output $D^1$ from the difference circuit 33 is proportional to the radio frequency multiplexed difference signal D. Thus, nominally, the signal $D^1$ passes through the four values $D_1$-$D_4$, and thus varies periodically in phase with respect to the signal $S^1$, in a symmetrical manner, having an average value of zero. However, since a portion of each of the signals S and D has passed through each of the receiver channels, any mismatch in gain or phase difference between the channels will manifest itself in the output signals $S^1$ and $D^1$. Specifically, if there is any mismatch in gain between the channels, the amplitudes of the four values of signal $D^1$ will be affected by different amounts, so that the average value of signal $D^1$ will no longer be zero, but will be positive or negative depending on which channel has the larger gain. Similarly, if there is any mismatch in phase difference between the channels, the phases of the four values of signal $D^1$ will be effected by different amounts, so that the average value of signal $D^1$ will again no longer be zero, being positive or negative depending on which channel has the larger phase difference.

In order to detect any mismatch in gain, the signal $S^1$ is fed to a phase-locked loop 60 comprising a phase sensitive detector 61 arranged to compare the output of the sum circuit 32 with the signal from a voltage controlled oscillator 62. The resultant signal from the detector 61 is integrated in an integrator 63, and is used to control the frequency of the oscillator 62. In this way, the frequency of the oscillator 62 is locked on to the frequency of the intermediate frequency signal from the sum circuit 32. The output signal from the oscillator 62 thus has the same frequency as the output signal from the receiver, but has a much narrower bandwidth. The effect of the phase-locked loop 60 is thus to act as a very narrow band-pass filter for the receiver output signal, the pass-band of this filter depending on the time constant of the integrator 63. This assists in discriminating between targets of closely similar frequencies, especially closely spaced targets and targets in formation.

The output from the oscillator is utilised for feeding to a discriminator circuit 45. This signal is also used for comparison with the output from the difference circuit 33, in the phase-sensitive detector 34, to produce a feedback signal for controlling the gain trim circuit 27. Nominally, the average output of the detector 34 is zero, but if there is any gain mismatch, the output of the detector 34 will develop a DC component. This component is measured in an integrator 35, and is used as a feedback signal to control the gain trim circuit 27, in such a manner as to tend to match the gain of the two channels and thus reduce the output of the integrator 35 to zero.

In order to detect any mismatch in phase, the signal $D^1$ is given a 90° phase shift in phase change circuit 36, and is then compared with the signal $S^1$ in a phase-sensitive detector 37. Nominally, the average output of the detector 37 is zero, but if any phase mismatch is present, the output of the detector 37 will develop a D.C. component. This D.C. component is measured in an integrator 38 and is used as a feedback signal to control the phase trim circuit 28, in such a manner as to tend to match the phase differences of the two channels and thus reduce the output of the integrator 38 to zero.

When the channels are matched in gain and phase difference, the output of the phase-sensitive detector 34 is proportional to the amplitude of the multiplexed difference signal D, and thus contains information concerning the two difference signals $D_{el}$ and $D_{az}$. To separate this information, the output of the detector 34 is fed to a multiplexer 39. This demultiplexer is controlled by the modulating signal M from the oscillator 4, delayed in a delay circuit 40 by an amount equal to the overall delay introduced by the receiver 10. The demultiplexer 39 comprises a first phase-sensitive detector 41 in which the output of detector 34 is compared with the delayed modulating signal, to produce an output $E_{el}$ which is proportional to the amplitude of the error signal $D_{el}$. The demultiplexer 39 also comprises a second phase-sensitive detector 42 in which the output of detector 34 is compared with the delayed modulating signal, shifted in phase by 90° by means of a phase-change circuit 43, to produce an output $E_{az}$ which is proportional to the amplitude of the error signal $D_{az}$.

The two outputs $E_{el}$ and $E_{az}$ from the demultiplexer 39 are used as error signals to control the operation of the servo motors (not shown) which tilt the aerial arrangement 1, in such a manner as to tend to reduce the amplitudes of the difference signals $D_{el}$ and $D_{az}$ to zero. The result of this is to cause the aerial 1 to track the target. The error signals are also fed to the autopilot (not shown) of the missile so as to enable the missile course to be suitably corrected to maintain it on a collision course with the target.

The output from the voltage controlled oscillator 62 is fed to an automatic gain control detector circuit 44, which produces automatic gain control signals for controlling the gains of intermediate frequency amplifiers 20, 21, 30 and 31, in such a manner as to tend to maintain the output of the sum circuit 32 at a constant level.

The output of the voltage controlled oscillator 62 is also applied to a frequency discriminator circuit 45, which produces an output signal proportional to the difference between the frequency of the intermediate frequency signal from the oscillator 62 and a predetermined value. This output is integrated in an integrator 46, and the result is used to control the frequency of a voltage controlled oscillator 47, the purpose of which will be explained below.

In operation, the system is subjected to high vibration levels from the missile motor. Under these conditions, the first local oscillator 11 tends to be very noisy, i.e. to have significant noise sidebands. This is undesirable, since the performance of the overall system depends critically on the quality of the output of the first local oscillator. In order to overcome this problem, a so-called rear reference phase-locked loop 49 is used. A rear aerial 50 is provided, to receive some of the illuminating radiation from the parent aircraft—one of the sidelobes of the radiating aerial may be used for this purpose—for use as a reference signal. This reference signal is mixed with the output of the local oscillator 11 in a mixer 51, to convert it to an intermediate frequency. The resultant intermediate frequency signal is passed through an amplifier 52 and a band pass filter 53. The gain of the amplifier 52 is controlled by an automatic gain control detector circuit 54, so as to tend to maintain the output of the filter 53 at a constant level. The output of the filter 53 is compared in a phase-sensitive detector 55 with the output of the oscillator 47, and the result is integrated in an integrator 56 and used to control the frequency of the local oscillator 11.

The result of this is that the frequency of the local oscillator 11 is locked in a fixed relationship to the frequency of the reference signal. Specifically, the frequency of the local oscillator is locked to a value equal to the difference between the reference signal frequency and the frequency of the oscillator 47. In this way, the vibration sidebands of the local oscillator 11 are substantially suppressed.

The automatic gain control circuit 54 controls a trigger circuit 57 which in turn controls the time constant of the integrator 56 according to the level of the automatic gain control signal, so as to reduce the bandwidth of the phase-locked loop 49 if the reference signal level drops below a certain predetermined value. In this way, the loop 49 adapts automatically to the level of the reference signal. Thus, when the reference signal received by the rear aerial 50 is strong, the bandwidth of the phase-locked loop 49 is relatively large, giving a significant reduction in the noise sidebands of the local oscillator 11. On the other hand, when the received reference signal level is low, the bandwidth of the loop 49 is reduced, so as to assist in filtering out the reference signal from noise generated in the amplifier 52. Thus, the signal-to-noise ratio of the reference signal is improved, although at the expense of a drop in the ability of the loop to suppress noise sidebands of the local oscillator 11.

In a modification, the bandwidth of the loop 49 may be varied continuously according to the reference signal level, instead of between two discrete values.

As mentioned above, the voltage controlled oscillator 47 which controls the frequency of the first local oscillator 11, is in turn controlled, by way of the discriminator 45 and the integrator 46, by the frequency of the intermediate frequency signal from the output of the receiver 10. This loop is arranged to maintain the frequency of the first intermediate frequency signal (from the mixers 12 and 13) in the centre of the passband of the speed gate filters 16 and 17, as follows. If the relative viscosity between the target and the missile or the missile and the parent aircraft changes slightly, the doppler frequency of the radio waves received by the frequency of the first intermediate frequency signal away from the centre frequency of the speed gates 16 and 17, which in turn will cause a shift in the frequency of the second intermediate frequency signal at the output of the receiver. This shift will be detected by the frequency discriminator 45, and will produce a change in the frequency of the oscillator 47, and hence in the frequency of the first local oscillator 11. This in turn will produce a change in the frequency of the first intermediate frequency signal, and it is arranged that this change is in such a sense as to tend to return this signal to the centre of the passband of the speed gates 16 and 17.

Thus, it will be seen that the effect of this loop is to maintain the frequency of the first intermediate frequency signal in the centre of the passband of the speed gates 16 and 17. As a result, the system tracks the doppler frequency of the target. This permits the system to discriminate between different targets on the basis of differences in their speeds even although they may be separated by too small an angle for sufficient angular discrimination.

The system differs from conventional doppler tracking system, in which doppler tracking is performed by means of an oscillator situated at an intermediate frequency stage of the receiver. In the present system, doppler tracking is performed using the first local oscillator, which enables the speed gate filters 16 and 17 to be placed at an early stage of the receiver. This means that the major portion of the receiver 10 has to deal with only a small range of frequencies, which simplifies the design of the receiver considerably.

The radar system as shown in FIG. 2 has the disadvantage that when the narrow band phase-locked loop 60 has locked on to a single target signal the bandwidth of the signal output of the voltage controlled oscillator 62 is reduced by the output of integrator 63 so that only that single target is within the bandwidth, all other targets being outside the bandwidth. If the signal from the selected single target suddenly shifts to outside the restricted bandwidth of the phase-locked loop 60 then the signal input from the voltage controlled oscillator 62 to the phase-sensitive detector 34 disappears and the missile loses tracking. In order to overcome this the narrow band phase-locked loop of FIG. 2 has been modified as shown in FIG. 3.

In FIG. 3 the parts 61, 62 and 63 of the original phase-locked loop are given the same references and the phase-sensitive detector 34 is also given the same reference number. The output of the phase-sensitive detector 34 is then used as in FIG. 2 to control the guidance of the missile for example via phase-sensitive detectors such as 41 and 42. A variable gain 300 is introduced into the phase-locked loop between the phase-sensitive detector 61 and the integrator 63. A quadrature phase-sensitive detector 301 is connected to compare inputs from the sum input and from a $\pi/2$ phase shifting network 302 connected to the output of the voltage controlled oscillator 62. The output of the quadrature phase-sensitive detector 301 is connected via a low pass filter 303 and via a threshold circuit 304 to a "change to wide band" input of the variable gain circuit 300. A further "complementary" output of the threshold circuit 304 is connected to one input of a two input AND gate 305 the other input of which is obtained from the target acquisition circuitry (not shown). The target acquisition circuitry gives an indication of the acquisition of a target when for example as the frequency of the radar system is tracked over a range of frequencies a large signal-to-noise ratio is obtained. The output of AND gate 305 is fed to a "change to narrow band" input of variable gain 300.

The operation of the circuit is as follows:- As the missile is in flight with the radar guidance system "on sweep" looking for the target, i.e. prior to acquisition of a target, the variable gain circuit 300 is set to a low gain corresponding to the wideband operation of the phase-locked loop. When target acquisition is obtained a signal is provided at one input of AND gate 305 from the target acquisition circuitry. Due to the $\pi/2$ phase change circuit 302 the signals now presented at the input of the quadrature phase-sensitive detector 301 will be out of phase producing an output d.c. level which passes through filter and time delay 303. This d.c. level is arranged, for a valid target signal, to be in excess of the threshold level of circuit 304 thus producing an output signal on the "signal present" output of threshold circuit 304. This signal combined with the target acquisition output signal in AND gate 305 produces the "change to narrow band" signal for variable gain 301. This signal causes the variable gain circuit 300 to effect a narrowing of the bandwidth of the phase-locked loop and to therefore lock the phase-locked loop to a single target signal.

If this single target signal should disappear either for example by virtue of the target disappearing or rapidly changing direction, the output of the voltage controlled oscillator will be in random phase with the input to the loop phase-sensitive detector 61 (both signals being substantially noise) and the output of the quadrature phase-sensitive detector 301 will be zero. The signal present at the output to the AND gate 305 will disappear and an output will be given to the variable gain circuit 300 to change to wideband thus enabling the phase-locked loop to search for a further target signal within this wider bandwidth.

The changes from wideband to narrowband and from narrowband to wideband are accomplished over different time periods as shown by FIGS. 3a and 3b. The change from wideband to narrowband, FIG. 3a, takes place over a relatively long period of time enabling the loop to lock to the single target signal. The change from narrowband to wideband, FIG. 3b, takes place over a relatively short period of time—almost instantaneously, since once the target signal has been lost it is imperative to increase the bandwidth as rapidly as possible to search for a further target signal. The circuitry necessary for ensuring the correct changeover characteristics is included within the variable gain 300.

For input signals with a high signal-to-noise ratio the time delay of circuit 303 is increased to for example 0.75 sec. and for low signal-to-noise ratio signals the time delay is decreased to 0.2 $\mu$sec. This ensures that spurious input signals do not unnecessarily upset the bandwidth of the loop.

With reference to FIG. 2 the sum signal to the phase-sensitive detector 34 is obtained from the output of the voltage controlled oscillator 62 and this can result in the case of multiple targets in the gain of the receiver being incorrect. This is because the phase-locked loop will lock to the frequency of one of the targets and therefore the spectral component in the output of the voltage controlled oscillator 62 will be of greater amplitude than the corresponding component in the original sum channel since the a.g.c. operates on the total sum signal passing through the receiver. Thus the angular scaling of the wanted target is reduced. In FIG. 3 two alternative circuit arrangements are shown for overcoming this problem.

The first shown in dotted lines is to obtain the receiver automatic gain control signal from the output of the quadrature phase-sensitive detector 301.

The second shown in chain dotted lines comprises dividing the output of the phase-sensitive detector 34 with the output of the quadrature phase-sensitive detector in a divider 306 after passing the former through a low pass filter 307. In this way the angular error output from the difference channel is divided by a d.c. value which is proportional to the component of the sum signal which is in phase with the spectral component in the output of the voltage controlled oscillator 62. Thus by dividing the angular error by this d.c. value the scaling will be restored to its correct value. This method also has the advantage that it compensates for the scaling low due to the voltage controlled oscillator not being at the correct average phase with respect to the wanted target signal due to the pulling effect of the unwanted signal.

However, in addition to the DC term the quadrature phase-sensitive detector 301 also has an AC term due to the beat between the signal output of the voltage controlled oscillator 62 and the unwanted signal.

Consider two targets T1 and T2 within the speedgate bandwidth.

Doppler frequency = 10 fn

Phase-locked loop damping = 0.7

Target ratio $T2/T1 = 5$

Phase-locked loop locked to the smaller signal T1

Instantaneous automatic gain control and no valid target lock.

The curves will be different for slow automatic gain control but the basic argument applies.

Figure 4:
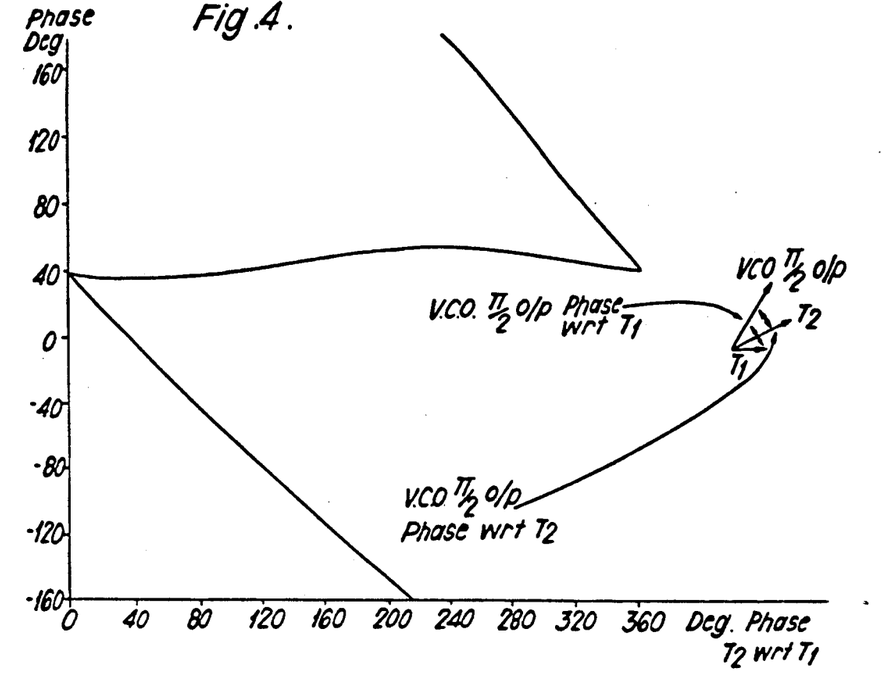
FIG. 4 shows the phase relationships between the phase shifted output of the voltage controlled oscillator in the circuit of FIG. 3 and two target signals.
Figure 5:
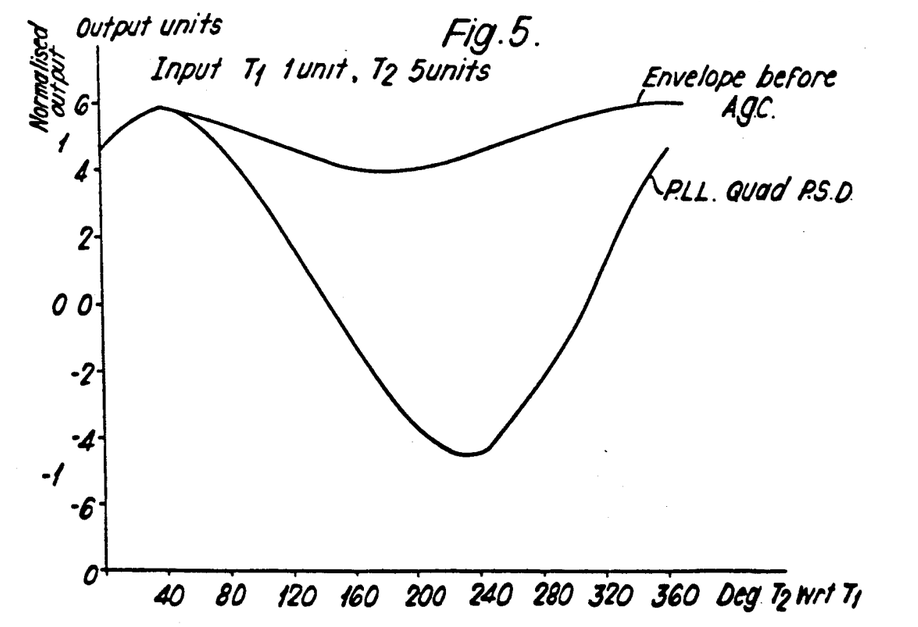
FIG. 5 shows the sum signal output and the quadrature phase-sensitive detector output for the circuit of FIG. 3.

FIG. 4 shows the voltage controlled oscillator phase at the $\pi/2$ output with respect to the phases of T1 and T2 (in the absence of T2 the voltage controlled oscillator $\pi/2$ output will be in-phase with T1). FIG. 5 shows the S envelope and the quadrature phase-sensitive detector output. It can be seen that a difference signal D due to T1 will produce a DC term at the angular error phase-sensitive detector of approximately 1/5. cos 42°. D/S and a small AC term due to the voltage controlled oscillator having phase modulation with respect to T1 phase. A difference signal due to T2 will produce a large AC term due to the difference in frequency from the voltage controlled oscillator main line and a small DC term due to the voltage controlled oscillator phase modulation.

With the employment of analogue divider 306 the AC output due to T2 is divided by the AC term in the quadrature phase-sensitive detector 301 output to produce a potentially large DC term. For the particular conditions taken the two AC terms are almost exactly in-phase thus producing a large dish bias towards the second target. If, however, the quadrature phase-sensitive detector 301 output is filtered by a low pass filter 308 the AC will be attenuated and the phase lagged. If this lag were 90° then the DC bias would be zero. If the lag were greater than 90°, i.e. a multipole filter, then the dish would point away from the second target.

The action of the receiver automatic gain control is similar although the effect is reversed for the conditions considered. When the sum signal S envelope is at its greatest the difference channel gain is reduced assuming fast automatic gain control but the phase-locked loop signal S' is constant, thus the scaling is reduced, similarly the gain is increased when the sum signal S envelope is low. This will cause the AC beat due to a difference (D) signal in-phase with the S component at W2 to have its positive peaks (corresponding to T2 in-phase with voltage controlled oscillator to be reduced and the negative peaks to be increased giving a negative output whereas T2 alone would have given a positive scaling (D and S in-phase) thus the dish points away from T2. The effect of slow automatic gain control is to delay the phase of the automatic gain control sinewave by 90° producing a positive bias, i.e. towards T2 as the unfiltered S envelope leads the angular phase-sensitive detector beat by 42°. For the conditions considered the automatic gain control effect will be much smaller than the analogue divider effect due to the relative amplitude of the AC terms involved but this may not always be true.

The filter in the quadrature phase-sensitive detector output must not have a time constant much longer than 100 ms in order to preserve the receiver ability to react to changes in relative target amplitude.

Figure 6:
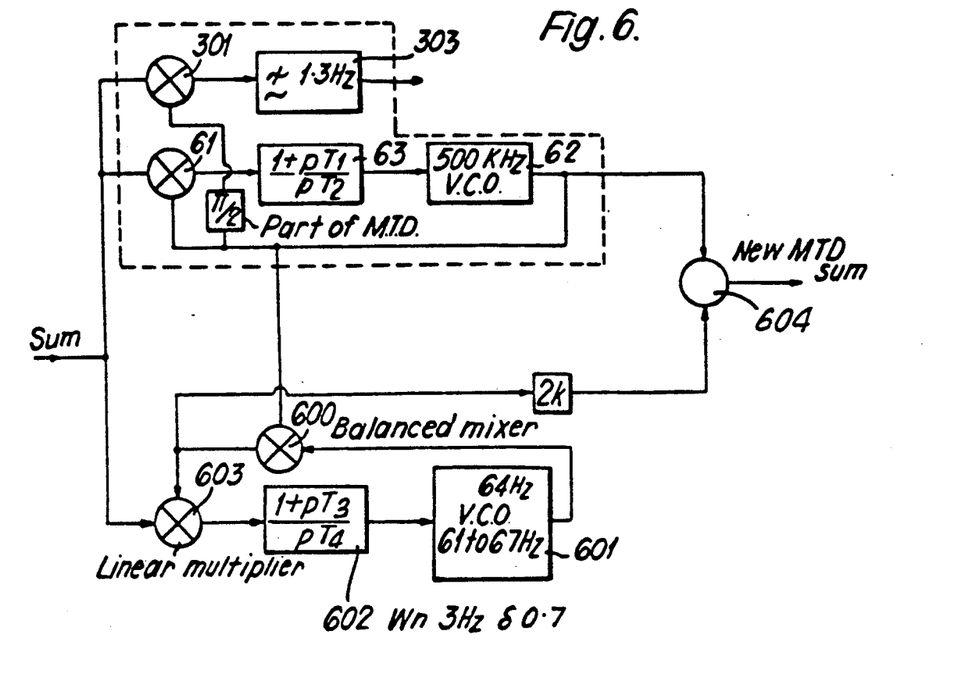
FIG. 6 shows in block diagrammatic form circuitry for adding constant amplitude first sidebands to the output of the voltage controlled oscillator of the narrow band phase-locked loop of FIG. 3.

A further modification to the circuit of FIG. 2 which may be used to reduce the variation in scaling which occurs when the multiple target discriminator or narrow band phase-locked loop is in operation as shown in FIG. 6, in which constant amplitude sidebands are added to the multiple target discriminator voltage controlled oscillator output which have the same phase relationship to the multiple target discriminator output as the original sum signal sidebands have to their carrier. This results in a change of scaling of 1.15 to 0.9 for a carrier locked multiple target discriminator and 1.02 to 0.64 for a first sideband locked multiple target discriminator as against 1.0 to 0.0 and 0.0 to 0.64 for the multiple target discriminator alone.

The block diagrams is shown in FIG. 6 to which reference is now made. The circuit of FIG. 6 produces a modified multiple target discriminator sum signal to be used in place of the output signal from the voltage controlled oscillator 62. Parts performing the same or similar functions to those in FIG. 3 are given the same reference numerals.

A balanced mixer 600 produces the first upper and lower sideband by mixing the multiple target discriminator voltage controlled oscillator output with the output of a second voltage controlled oscillator 601 at the nutation frequency, this voltage controlled oscillator is locked to the first upper and lower sideband of the sum signal by the second phase-locked loop comprising mixer 600, voltage controlled oscillator 601, in integrator 602 and a linear multiplier 603. A proportion of the output from the balanced mixer 600 is added to the multiple target discriminator sum output to produce a composite sum signal with pseudo first upper and lower sidebands which have a constant amplitude.

As the nutation voltage controlled oscillator 601 does not have to track the sum signal rates its bandwidth can be made small so as to reject sidebands from other target sum signals.

So far it has been assumed that the multiple target discriminator including voltage controlled oscillator 62 is locked to the main line of the sum signal but it can easily be locked to a sideband, in this case the balanced mixer 600 output will produce lines either side of that sideband. Analysis of the method.

Let the input signal be $$A \sin[(\omega-p)t+\psi] + \sin(\omega t) + B \sin[(\omega+p)t+\gamma]$$

The 500 kHz voltage controlled oscillator output will then be $$\cos(\omega t)$$

and the 64 Hz voltage controlled oscillator $$\cos[pt+\Phi]$$

then the balanced mixer output is $$\tfrac{1}{2}\{\cos[(\omega-p)t-\Phi] + \cos[(\omega+p)t+\Phi]\}$$

The nutation phase-locked loop phase-sensitive detector output d.c. terms are $$\tfrac{1}{2}\{A\sin[\psi+\Phi] + B\sin[\gamma-\Phi]\}$$

which must be zero.
Therefore $$\cos(\Phi)\{A\sin(\psi) + B\sin(\gamma) + \sin(\Phi)\{A\cos(\psi) - B\cos(\gamma)\} = 0$$

$$\Phi = \tan^{-1} \frac{B\sin(\gamma) + A\sin(\psi)}{B\cos(\gamma) - A\cos(\psi)} \quad (1)$$

The output from the balanced Mixer is then $$\cos[pt+\Phi]\cos(\omega t) = \tfrac{1}{2}\{\cos[(\omega-p)t-\Phi] + \cos[(\omega+p)t+\Phi]\}$$

The new multiple target discriminator sum is then $$K\cos[(\omega-p)t-\Phi] + \cos(\omega t) + K\cos[(\omega+p)t+\Phi] \quad (2)$$

The main phase-sensitive detector of the receiver must be changed to a multiplier as limiting of either the input or the new multiple target discriminator signal will remove the sidebands. (This statement assumes that the nutation modulation is either zero or $\pi$ radians).

The new sum signal must be phase shifted as before, before being multiplied with the difference signal of $$2E\{A\sin[(w-p)t+\Phi] + C\sin(\omega t) + B\sin[(\omega p)t-\gamma]$$

The resultant output is $$E\{AK\cos(\omega-\Phi) + C + BK\cos(\omega-\Phi)\} \quad (3)$$

With the multiple target discriminator phase-locked loop locked to a single target the difference signal assuming that the nutation modulation switches between o and $\pi$ is $$E\left\{\left(\frac{\phi}{\pi} - 1\right) + \frac{4}{\pi}\Sigma\frac{1}{m}\sin\left(\frac{\phi m}{2}\right)\cos(mqt + m\delta)\right\}\sin(\omega - t) \quad (4)$$

where
- $\phi$ is the angle over which the nutation phase is zero
- $\delta$ is the phase angle of the nutation waveform
- m the nutation harmonic number.

From (3) this gives a receiver output of $$E\left\{ K\frac{2}{\pi} \sin\left(\frac{\phi}{2}\right) \cos(\delta + \Phi) + \left(\frac{\phi}{\pi} - 1\right) + K\frac{2}{\pi} \sin\frac{\phi}{2} \cos(\delta + \Phi) \right\}$$

From (1)

$$\Phi = -\delta$$

Also the phase of the multiple target discriminator voltage controlled oscillator 62 will change by $\pi$ radians when the sum carrier changes by $\pi$ radians. This also results in the nutation voltage controlled oscillator 601 changing by $\pi$ radians to remain locked to the first upper and lower sidebands which results in no phase change of the pseudo sidebands although there will be a transit phase shift as the nutation voltage controlled oscillator changes phase.

This gives the receiver output as $$E\left\{ K\frac{4}{\pi} \sin\left(\frac{\phi}{2}\right) + \left(\frac{\phi}{\pi} - 1\right) \right\} \quad (5)$$

Figure 7:
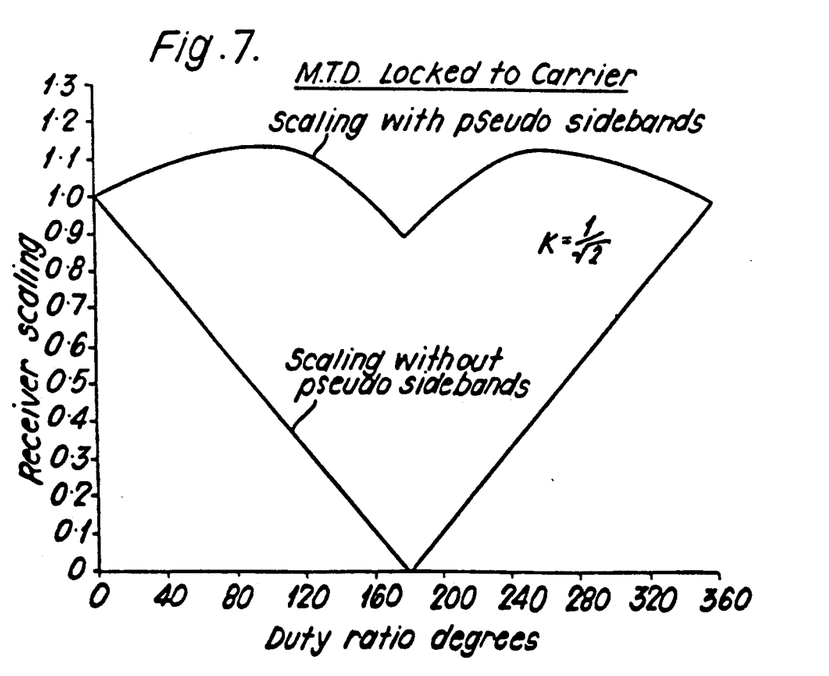
FIG. 7 shows waveforms illustrating the improved scaling of the missile receiver when modified according to FIG. 6 with the narrow band phase-locked loop locked to a single target.

In FIG. 7 the receiver scaling is shown plotted against $\Phi$ for $K = 1/\sqrt{2}$.

With the multiple target discriminator phase-locked loop locked to a first sideband $$E\left\{ K\left(\frac{\phi}{\pi} - 1\right) \cos(\delta + \Phi) + \frac{2}{\pi} \sin\left(\frac{\phi}{2}\right) + K\frac{1}{\pi} \sin(\phi)\cos(\delta + \Phi) \right\}$$

From (1) $\Phi = -\delta$.

In this case the phase of this multiple target discriminator voltage controlled oscillator 62 does not change phase but as both the lines either side of the line the multiple target discriminator is locked to change phase by $\pi$ degrees the receiver output becomes -

$$E\left\{ K\left(\frac{\phi}{\pi} - 1\right) + \frac{2}{\pi} \sin\left(\frac{\phi}{2}\right) + K\frac{1}{\pi} (\sin(\phi)) \right\} \quad (6)$$

Figure 8:
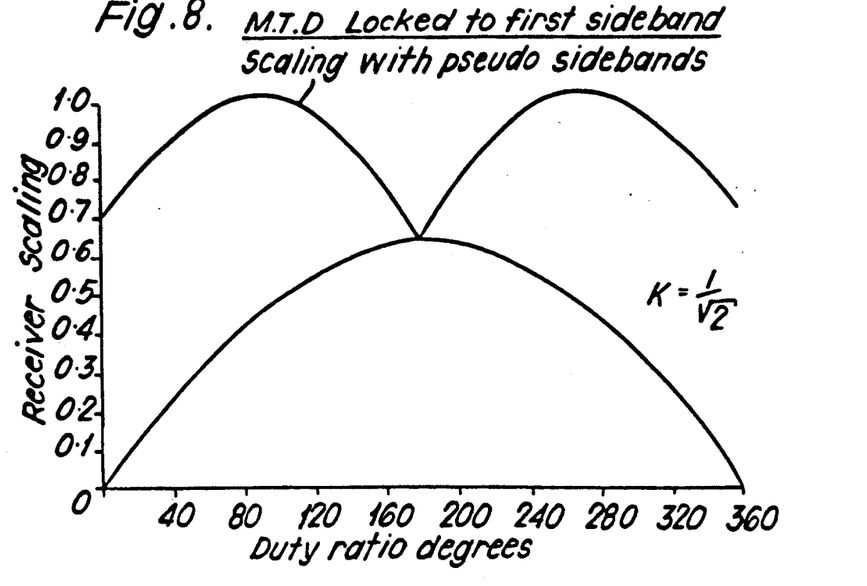
FIG. 8 shows waveforms illustrating the improved scaling of the missile receiver when modified according to FIG. 6 with the narrow band phase-locked loop locked to a single target.

In FIG. 8 the receiver scaling is shown plotted against $\phi$ for $K = 1/\sqrt{2}$.

The nutation phase modulation was taken as switching between o and $\pi$ radians. This results in equal amplitude sidebands either side of the carrier with equal and opposite phase angles. If the amplitude of the two lines either side of the multiple target discriminator voltage controlled oscillator 62 are not equal but have equal and opposite phase angles the pseudo sidebands will have the right phase angles for demodulating the difference signal (i.e. the case of the first sideband locked multiple target discriminator and an improvement will be obtained, but if these two lines have equal amplitudes and phase angles the pseudo sidebands will be $\pi/2$ radians different from the above result and no improvement will result.

In general if the nutation modulation is not what was assumed the improvement in scaling will be less than that shown but should not be worse than for the multiple target discriminator alone. The range of the voltage controlled oscillator 601 should be as small as possible and in a typical example a range of from 61 to 67 Hz is chosen to cover the possible nutation frequency range. This will enable the loop to pull into lock quickly with a small enough bandwidth to reject other target lines produced from multiple targets. As it is required to track the two nutation lines either side of the multiple target discriminator locked line a sinusoidal output is desirable to avoid other nutation or target lines influencing the voltage controlled oscillator phase angle.

Figure 9:
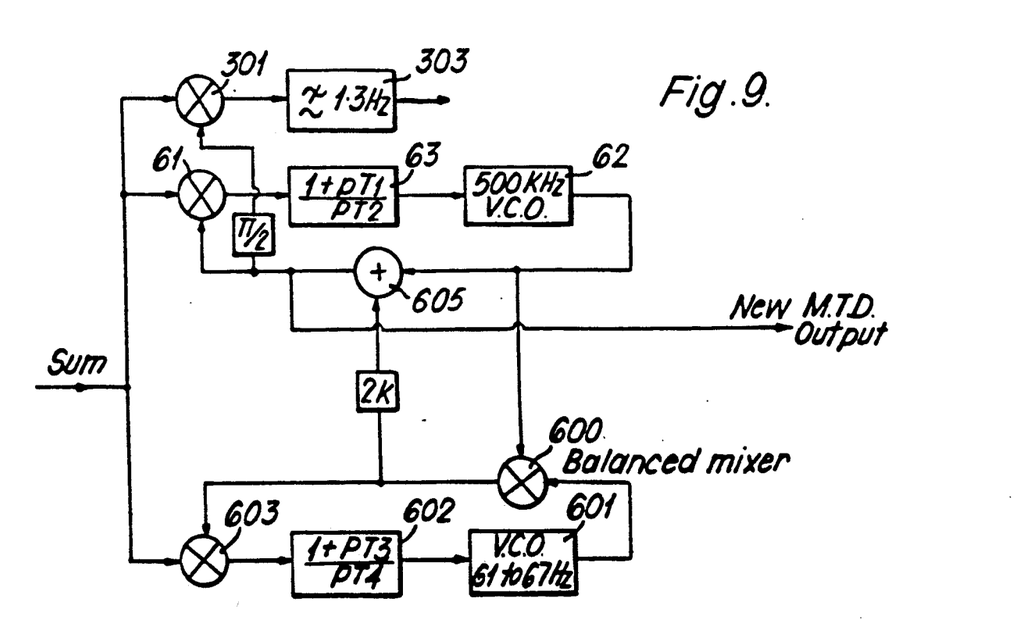
FIG. 9 shows in block diagrammatic form circuitry for adding pseudo sidebands to the narrow band phase-locked loop voltage controlled oscillator of FIG. 3.

If pseudo sidebands are added to the output of the multiple target discriminator voltage controlled oscillator 62 within the multiple target discriminator phase-locked loop, the change of natural frequency and damping with nutation duty ratio is reduced resulting in a reduction in the number of times the multiple target discriminator transferred lock to other target sum signals which have frequency lines between the locked sum line and the lines either side of it. In FIG. 9 the block diagram of such a system is shown. During the locking process it may be preferable to switch out the pseudo sidebands on the multiple target discriminator voltage controlled oscillator.

An improvement in scaling changes with nutation duty ratio can thus be obtained by the addition of a second phase-locked loop at the nutation frequency together with a balanced mixer. The variation in scaling with the proposed system assuming the nutation modulation switches the phase of the signal between o and $\pi$ radians will be with a K value of $1/\sqrt{2}$; 1.15 to 0.9 for a carrier locked multiple target discriminator and 1.02 to 0.64 for a first sideband locked multiple target discriminator. These figures without this system will be 1.0 to 0.0 and 0 to 0.64 and if the best scaling is obtained by picking the best multiple target discriminator locked condition that is carrier or first sidebands lock 1.0 to 0.54.

The pseudo sidebands can as described be added to the multiple target discriminator voltage controlled oscillator within the multiple target discriminator phase-locked loop resulting in a reduction in the variation in loop bandwidth with nutation duty ratio and a possible reduction in the number of changes of tracked target in a multiple target situation.

A further problem which can arise with the system of FIG. 2 is that low frequency beats can occur between harmonics of the multiplexing frequency and multiples of the doppler difference frequency between two targets and also multiples of the nutation frequency. The resulting low frequency disturbances produce a spurious acceleration demand and degrade the performance of the multiplexed receiver. The circuit of FIG. 10 has been designed to detect the low frequency beats and switch the multiplexing frequency to avoid coincidence with the doppler difference and nutation frequency.

Figure 10:
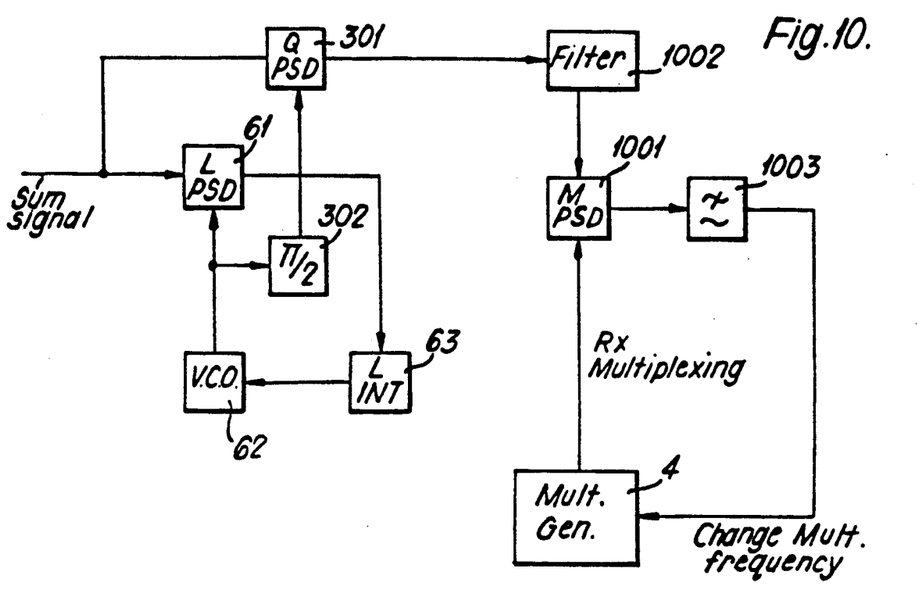
FIG. 10 shows in block diagrammatic form circuitry for the elimination of interference on the multiplexing from the multiple target discriminator (narrow band phase-locked loop)

Referring now to FIG. 10, parts which perform the same or a similar function to the system of FIGS. 2 and 3 are given the same reference numerals. The output of the multiple target discriminator quadrature phase-sensitive detector 301, which has frequency components equal to the doppler difference and nutation if present, is fed to a further phase sensitive detector 1001 via a filter 1002, the other input to the phase-sensitive detector 1001 being the multiplexing waveform. When multiples of these signals frequencies approach coincidence the low frequency disturbance passes through a filter 1003 and switches the multiplexing frequency from for example 40 Hz to 35 or 45 Hz to avoid coincidence. The switching earths the filter output for a short period after the bistable has changed state to prevent the overswing of the disturbance switching the multiplexing frequency back into coincidence.

Figure 11:
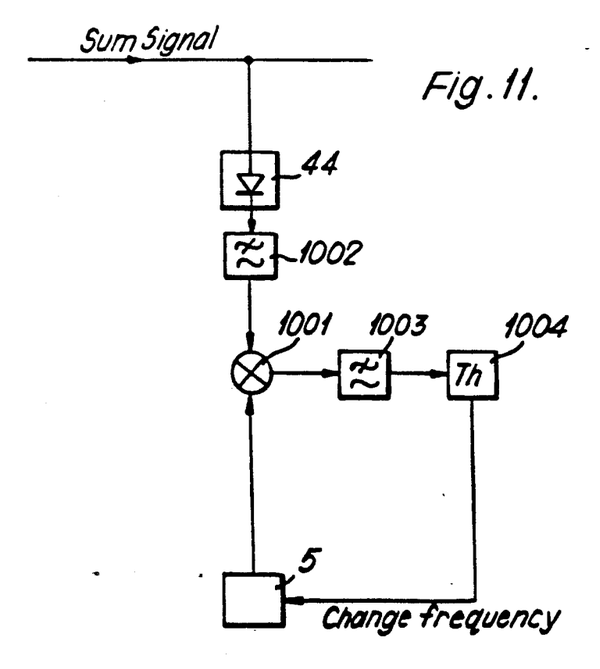
FIG. 11 shows in block diagrammatic form an alternative form of elimination of interference on the multiplexing frequency in a missile guidance system.

As an alternative to the arrangement of FIG. 10, it is possible to use the detected sum signal input as the input to the phase-sensitive detector 1001 for comparing with the multiplexing signal as shown in FIG. 11. The output of the automatic gain control detector 44 (see FIG. 2), which detector is shown as connected directly to the receiver sum signal, is connected to filter 1002. A threshold detector 1004 is connected to the output of filter 1003 and thus the multiplexing frequency is only changed when the output of the filter exceeds the threshold level.

The circuitry for changing the multiplexing frequency can be included in a missile guidance system with or without multiple target discrimination. If a multiple target discrimination facility such as the narrow band phase-locked loop 60 is provided the multiplex frequency changing system may be included with or without the variable gain feature enabling widening of the bandwidth of the narrow band phase-locked loop.

A further problem which arises with the use of the narrow band phase-locked loop as described with reference to FIG. 2 above is that the narrow bandwidth is of the order of 20–30 Hz and it is found that the spectrum of a target return may widen up to 80 Hz if the target pulls a sudden high acceleration laterally (due to its glint spectrum widening). A constant bandwidth narrow bandwidth phase-locked loop tends to have a reduced tracking ability on such a target and for acceleration above a certain value this can cause a loss of lock. This in turn causes an interruption in guidance and can result in a large miss distance or poor target discrimination. The network of FIG. 12 detects the widening of the target spectrum return and widens the narrow band phase-locked loop bandwidth appropriately for the duration of the transient condition thus preventing loss of lock.

Figure 12:
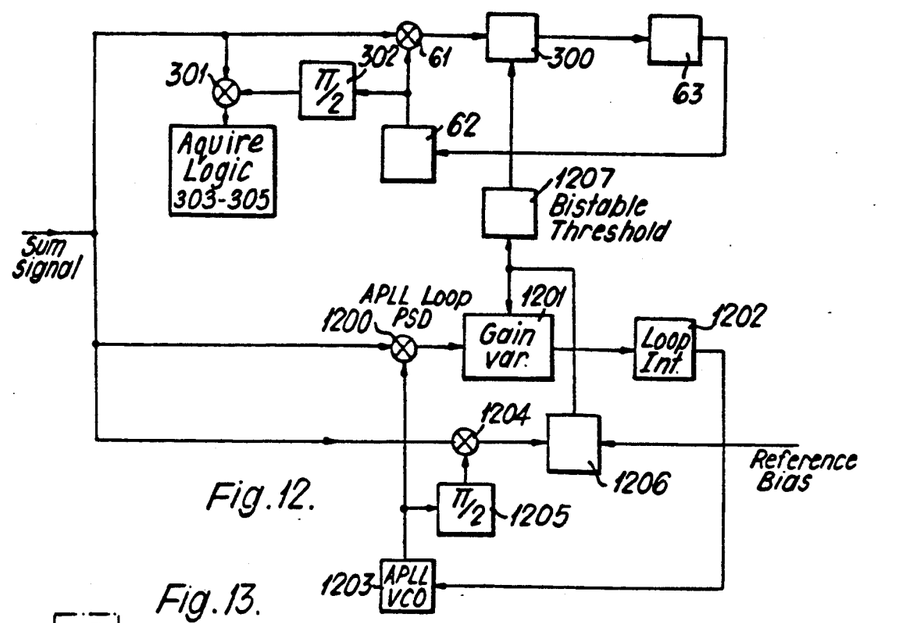
FIG. 12 shows in block diagrammatic form circuitry for the automatic control of the bandwidth of the narrow band phase-locked loop of FIG. 3.

Referring now to FIG. 12, the parts of the network performing the same or similar functions to the system of FIGS. 2 and 3 are given the same reference numerals.

The sum signal is fed to the narrow band phase-locked loop via phase-sensitive detectors 61 and 301 and also to a further adaptive phase-locked loop. The adaptive phase-locked loop comprises a phase-sensitive detector 1200, a variable gain 1201, a loop integrator 1202 and a voltage controlled oscillator 1203. The sum signal is also fed to a quadrature phase-sensitive detector 1204 the other input of which is the output of voltage controlled oscillator 1203 phase shifted $\pi/2$ by phase shifter 1205. The d.c. output of phase-sensitive detector 1204 is compared in a comparator 1206 with a fixed reference bias. The output of comparator 1206 is used to control the gain of variable gain 1201 and is fed as control input to a bistable threshold circuit 1207. The output of bistable 1207 controls the bandwidth of the narrow band phase-locked loop by controlling the gain of variable gain 300.

In operation the adaptive phase-locked loop adapts its bandwidth in proportion to the input signal spectrum width by alteration of the output level of comparator 1206 and hence alteration of the gain of variable gain 1201. When the comparator output exceeds a given threshold set by the bistable threshold circuit 1207 the bistable element is set and the set output of the bistable alters the gain of variable gain 300 by a predetermined amount. This predetermined amount widens the bandwidth of the narrow band phase-locked loop by an amount sufficient to enclose the spectrum of the target signal. In the above example the bandwidth is enlarged from 30 to 80 Hz.

A yet further problem which may arise with the use of a multiple target discriminating narrow band phase-locked loop is that it may not be able to track all types of target signals. The inventive solution to this problem is to latch out the multiple target discriminating narrow band phase-locked loop and also to recommence the doppler sweep (which of course is normally stopped after target acquisition has been obtained and the narrow band phase-locked loop is operative) at the correct frequency and in the required "direction" of frequency increase or decrease.

Figure 13:
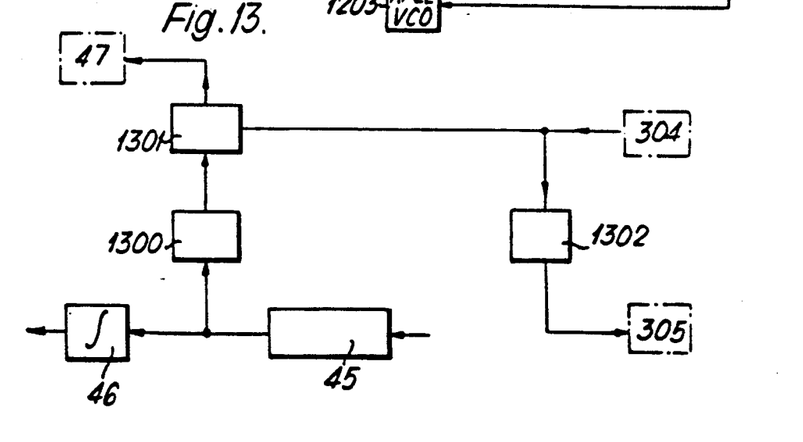
FIG. 13 shows in block diagrammatic form circuitry for the latching out of the multiple target discriminating narrow band phase-locked loop of FIG. 3 and for control of the doppler sweeping.

Referring now to FIG. 13, the parts of the receiver of FIG. 3 and FIG. 2 which perform the same or similar functions are given the same reference numerals. In FIG. 2 and FIG. 13 therefore the output of the voltage controlled oscillator 62 is fed via a discriminator 45 to an integrator 46. A switching circuit 1300 is connected to the output of the discriminator, the output of switching circuit 1300 being connected to a first control input of a sweep generator 1301 the output of which is used to further control the voltage controlled oscillator 47. A further control input to sweep generator 1301 is provided by the "change to wideband" output of threshold circuit 304 (FIG. 3) which output is also used to set a latch 1302 the output of which is used to inhibit AND gate 305 preventing any further change to narrow band.

Figure 14:
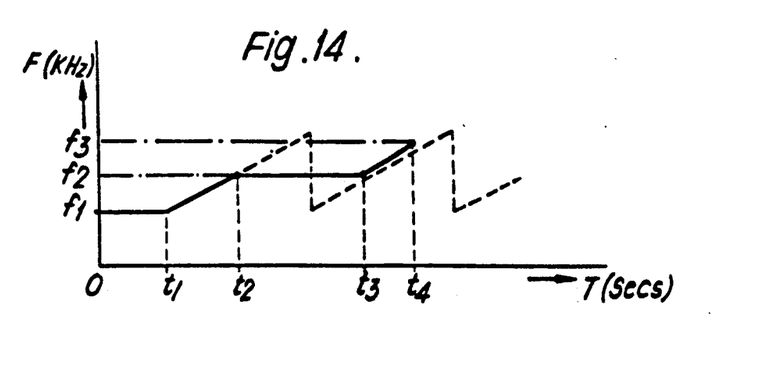
FIG. 14 shows a doppler sweep waveform associated with the circuitry of FIG. 13.

The operation of the circuit explained with reference to FIG. 14 is as follows:

The missile receiver circuitry after activation (usually by a time lapse arrangement after firing) commences a doppler sweep for the target. In FIG. 14 the time lapse is shown as from 0 to $t_1$ and the doppler sweep is commenced at $t_1$. The target is assumed to be acquired by the receiver circuitry at a time $t_2$ at which time the doppler sweep is stopped at the target frequency. The normal pattern for the doppler sweep is shown continued in dotted lines, the intermediate frequency of the receiver being swept over a range of frequencies and if no target is found the sweep being recommenced from a starting frequency.

The target is now successfully tracked from a time $t_2$ to a time $t_3$ during which time period the multiple target discriminating narrow band phase-locked loop is activated. The narrow band phase-locked loop is assumed to lose track of the target at the time $t_3$ and the target is assumed to have moved in frequency in an "increasing frequency" direction. The doppler sweep is commenced in this direction at the time $t_3$ or soon thereafter and to sweep in an increasing frequency direction as shown between $t_3$ and $t_4$ where the target is again "acquired" by the receiver circuitry.

The direction in which the doppler sweep is recommenced is determined by the switch 1300 as follows:

When the target moves out of the narrow bandwidth of the narrow band phase-locked loop the discriminator will be attempting to alter the frequency of voltage controlled oscillator 47 (see FIG. 2) to compensate for this movement. The discriminator 45 output will therefore be either a maximum positive or a maximum negative voltage depending on the direction of frequency movement of the target signal and this is detected by the switch 1300 which then switches to a position indicating in which the direction the frequency of the target was moving when the narrow band phase-locked loop lost lock. The output of the switch 1300 is then used to give a direction of sweep control signal to the sweep generator 1301 which sweep generator is activated by the change to wideband signal from the threshold circuit 304. In this embodiment the change to wideband signal is used to set the latch 1302 which provides an inhibit input to AND gate 305 (FIG. 3) to prevent the subsequent operation of the narrow band phase-locked loop. Thus the missile will continue to track the target using the relatively wide bandwidth provided by the speedgate filters 16, 17 (FIG. 2).

We claim:

1. A tracking radar system comprising:
   A) an aerial arrangement having a plurality of outputs;
   B) means for deriving from the aerial outputs a sum signal representative of the sum of the aerial outputs and a difference signal representative of the direction of a target relative to the aerial;
   C) a receiver for processing said signals to produce corresponding intermediate frequency sum and difference signals;
   D) means for comparing the intermediate frequency sum signal with the output of an oscillator in a first phase-locked loop and using the resulting signal to control the oscillator frequency so as to cause the oscillator to lock on to the frequency of the intermediate frequency sum signal;
   E) a phase-sensitizer detector for comparing the intermediate frequency difference signal with the output of the oscillator to produce an output signal representative of the phase difference between the sum and difference signals; and
   F) bandwidth alteration means responsive to the sum signal to alter the bandwidth of the first phase-locked loop,
      a) the band width alternation means including a quadrature phase-sensitive detector for comparing the $\pi/2$ phase shifted output of the oscillator and the intermediate frequency sum signal, a filter and time delay circuit connected to the output of quadrature phase-sensitive detector, and a threshold detector connected to the output of the filter and time delay circuit and arranged to produce a first output signal for changing gain of the variable gain circuit to decrease the bandwidth of the first phase-locked loop.

2. A tracking radar system as claimed in claim 1, wherein a second output signal of the threshold detector is operative to increase the bandwidth of the first phase-locked loop.

3. A tracking radar system as claimed in claim 1, wherein the first output signal of the threshold detector is combined with a signal indicating acquisition of a valid target, both signals being required before the bandwidth of the phase-locked loop is decreased.

4. A missile including a tracking radar system as claimed in claim 1.

5. A tracking radar system comprising:
   (a) an aerial arrangement having a plurality of outputs;
   (b) means for deriving from the aerial outputs a sum signal representative of the sum of the aerial outputs and a difference signal representative of the orientation of a target relative to the aerial;
   (c) a receiver for processing said sum and difference signals to produce corresponding intermediate frequency sum and difference signals;
   (d) means for comparing the intermediate frequency sum signal with the output of an oscillator in a first phase-locked loop and using the resulting signal to control the oscillator frequency so as to cause the oscillator to lock on to the frequency of the intermediate frequency sum signal; and
   (e) a quadrature phase-sensitive detector connected for comparison of the intermediate frequency sum signal and the $\pi/2$ phase shifted output of the oscillator, the output of the quadrature phase-sensitive detector being connected to the receiver for the provision of automatic gain control.

6. A tracking radar system comprising:
   (a) an aerial arrangement having a plurality of outputs;
   (b) means for deriving from the aerial outputs a sum signal representative of the sum of the aerial outputs and a difference signal representative of the direction of a target relative to the aerial;
   (c) a receiver for processing said sum and difference signals to produce corresponding intermediate frequency sum and difference signals;
   (d) means for comparing the intermediate frequency sum signal with the output of an oscillator in a first phase-locked loop and using the resulting signal to control the oscillator frequency so as to cause the oscillator to lock on to the frequency of the intermediate frequency sum signal;
   (e) a phase-sensitive detector arranged to compare the intermediate frequency difference signal with the output of the oscillator, so as to produce an output signal representative of the phase difference between the sum and difference signals;
   (f) a quadrature phase-sensitive detector connected for comparison of the intermediate frequency sum signal and the $\pi/2$ phase shifted output of the oscillator; and
   (g) a divider for division of the output of the phase-sensitive detector, the output of the divider being connected to the receiver for the provision of automatic gain control.

7. A tracking radar system as claimed in claim 1, including a low pass filter interposed between the output of the quadrature phase-sensitive detector and the divider.

8. A tracking radar system as claimed in claim 7, wherein the time constant of the low pass filter is greater than 100 ms.

9. A tracking radar system comprising:
   (a) an aerial arrangement having a plurality of outputs;
   (b) means for deriving from the aerial outputs a sum signal representative of the sum of the aerial outputs and a difference signal representative of the direction of a target relative to the aerial;

(c) a receiver for processing said signals to produce corresponding intermediate frequency sum and difference signals;

(d) means for comparing the intermediate frequency sum signal with the output of a first oscillator in a first phase-locked loop and using the resulting signal to control the oscillator frequency so as to cause the oscillator to lock on to the frequency of the intermediate frequency sum signal;

(e) a second phase-locked loop including a second oscillator, a mixer, a linear multiplier and an integrator;

(f) the mixer being arranged to mix the output of the first oscillator with the output of the second oscillator and provide an output signal;

(g) the multiplier being arranged to multiply the output signal from the mixer by the intermediate frequency sum signal and provide an output signal;

(h) the output signal from the multiplier being applied to the second oscillator via the integrator to control the frequency thereof; and (i) a combination circuit for combining the output signal from the mixer with the output signal from the first oscillator, the combined signal when formed being the multiple target discriminated sum signal for use in guiding the radar system.

10. A tracking radar system as claimed in claim 9, wherein the output of the mixer of the second phase-locked loop is connected to a combination circuit included in the first phase-locked loop, the output of the combination circuit being the multiple target discriminated intermediate frequency sum signal for use in guiding the radar system.

11. A tracking radar system as claimed in claim 9, wherein the combination circuit is a linear adder.

12. A tracking radar system comprising:

A) an aerial arrangement having a plurality of outputs;

B) means for deriving from the aerial outputs a sum signal representative of the sum of the aerial outputs and difference signal representative of the direction of a target relative to the aerial;

C) a receiver for processing said signals to produce corresponding intermediate frequency sum and difference signals;

D) means for comparing the intermediate frequency sum signal with the output of an oscillator in a first phase-locked loop and using the resulting signal to control the oscillator frequency so as to cause the oscillator to lock on to the frequency of the intermediate frequency sum signal;

E) a phase-sensitive detector arranged to compare the intermediate frequency difference signal with the output of the oscillator so as to produce an output representative of the phase difference between the sum and difference signals; and F) bandwidth alteration means responsive to the sum signal alter the bandwidth of the first phase-lock loop, the bandwidth alteration means including means for detecting a broadened spectrum from a single target and means for broadening the bandwidth of the phase-locked loop by a predetermined amount to a bandwidth greater than the broadened spectrum a) the means for detecting a broadened spectrum including a further phase-locked loop connected to the intermediate frequency sum signal output of the receiver, the further phase-locked loop including a further phase-sensitive detector and a further voltage controlled oscillator, the further phase-sensitive detector being arranged to compare the intermediate frequency sum signal with the output of the further voltage controlled oscillator, the output of the further phase-sensitive detector being connected to a comparator for comparison with a reference bias, the bandwidth of the phase-locked loop being broadened by the predetermined amount when the comparator output exceeds a predetermined threshold level.

13. A tracking radar system comprising:

(a) an aerial arrangement having a plurality of outputs;

(b) means for deriving from the aerial outputs a sum signal representative of the sum of the aerial outputs and a difference signal representative of the orientation of a target relative to the aerial;

(c) a receiver for processing said signals to produce corresponding intermediate frequency sum and difference signals;

(d) means for comparing the intermediate frequency sum signal with the output of an oscillator in a first phase-locked loop and using the resulting signal to control the oscillator frequency so as to cause the oscillator to the frequency of the intermediate frequency sum signal;

(e) a phase-sensitive detector arranged to compare the intermediate frequency difference signal with the output of the oscillator so as to produce an output signal representative of the phase difference between the sum and difference signals;

(f) bandwidth alternation means responsive to the sum signal to alter the bandwidth of the first phase-locked loop;

(g) a discriminator circuit responsive to changes in the frequency of the output signal of the oscillator; and (h) a switching circuit connected to the output of the discriminator, whereby in operation, the bandwidth alteration means produces a change to wide bandwidth signal for energisation of a target search sweep generator, the direction of increase or decrease in frequency of the target search sweep generator being controlled by the switching circuit.

14. A tracking radar system as claimed in claim 13, wherein the switching circuit is set in a first operative condition in response to a positive voltage output from the discriminator and in a second operative condition in response to a negative voltage output from the discriminator.

15. A tracking radar system as claimed in claim 13, wherein the change to wideband signal is operative to prevent further operation of the narrow band phase-locked loop.

* * * * *